March 11, 1958 H. D. DESBROW 2,826,649

SOUND CONTROL APPLIANCE FOR TELEPHONE TRANSMITTER

Filed July 6, 1954

INVENTOR.
HAROLD D. DESBROW
BY Lynn L. Latta
ATTORNEY 2,826,649

SOUND CONTROL APPLIANCE FOR TELEPHONE TRANSMITTER

Harold D. Desbrow, Los Angeles, Calif.

Application July 6, 1954, Serial No. 441,213
8 Claims. (Cl. 179—187)

The invention relates to an appliance for a conventional telephone wherein one's voice or extraneous noises may be selectively excluded from the transmitter of the telephone.

In the conventional telephone construction the mouthpiece thereof includes a perforated cap with the transmitter diaphragm spaced beneath the cap. A sound excluding appliance of the type in which a perforated sound screen is adapted to be secured over the transmitter of the telephone and a perforated shutter is positioned so as to be moved relative to the sound screen to selectively open or close the screen perforations with reference to the shutter perforations is old in the art and it is to be understood that my invention relates to certain new and useful improvements in the construction of such an appliance.

An object of the invention is to provide a sound excluding appliance for a conventional telephone having improved sealing characteristics for sound exclusion purposes.

Another object of the invention is to provide novel means for securing the appliance to the cap of the telephone mouthpiece.

Another object of the invention is to provide improved means for moving the shutter perforations into and out of registry with the screen perforations as desired.

Other objects and advantages of the invention will be apparent from the ensuing specification and the appended drawing in which.

Figure 1:
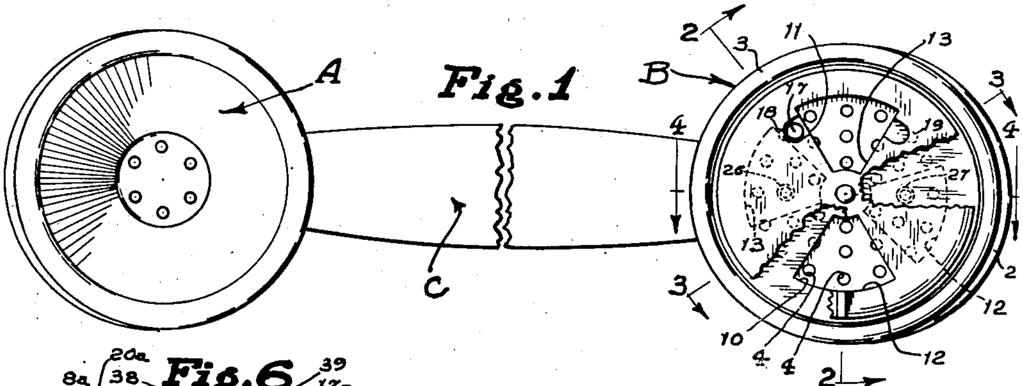
Fig. 1 is an underneath view of a conventional receiver-transmitter telephone instrument with the sound excluding appliance secured at the transmitter end thereof.

Referring to the form of the invention as shown in Figs. 1, 2, 3 and 4 the receiver-transmitter telephone instrument includes a receiver unit A and a transmitter unit B interconnected by means of an arm C which provides a hand grip for the user of the telephone instrument.

The transmitter unit of the telephone instrument is positioned within a housing 2 the open end of which is closed off with a suitable protective cap 3 which is provided with a large number of symmetrically arranged perforations 4 through which the sound waves travel to the transmitter unit when one is speaking into the transmitter end of the telephone instrument.

The sound excluding accessory includes a lower screen 5 which may be of circular shape and of concave-convex section so that the internal surface area 6 thereof hugs the entire upper surface area 7 of the cap 3 in generally tight frictional engagement therewith. A shutter 8 may be of circular shape and of concave-convex section so that the internal surface area thereof tightly hugs the external surface 9 of the screen 5, in a generally tight frictional sealing engagement therewith. The screen 5 may be provided with diametrically opposed large openings 10 and 11 which may be of substantially the same configuration and the same size as the diametrically opposed openings 12 and 13 in the shutter 8. A rivet 14 may have one head portion 15 the under surface of which is preferably flush with the under surface 6 of the screen, the opposite end of the rivet being peened over at 16 to anchor the shutter relative to the screen but permitting rotation of the shutter relative to the screen about the axis of the rivet.

A lug 17 may be formed on the upper surface of the screen and project outwardly beyond the plane thereof so as to project upwardly through the opening 13 in the shutter, the lug being engageable with the end of the notchs 18 and 19 to define the limits of arc of movement of the shutter relative to the screen, the length of the arc being such that when the tab 20 is manually grasped and the shutter is rotated clockwise until the boss 17 is received within the notch 18 and is in engagement with the end of said notch, then the opening 13 in the shutter will be in registry with the opening 11 in the screen (this position of rotation of the shutter relative to the screen being shown in Fig. 1) and when the shutter is rotated counter-clockwise so that the boss 17 is received within notch 19 and is in engagement with the end of said notch, then the openings 12 and 13 in the shutter will be rotated to the positions as indicated in dotted lines in Fig. 1 wherein they are completely out of registry with the openings 10 and 11 in the screen. In this position the perforations 4 in the transmitter cap are completely blocked off and sound is prevented from travelling through the transmitter unit. In the position of shutter and screen as indicated in solid lines in Fig. 1 with the openings 12 and 13 in registry with openings 10 and 11 respectively a substantial number of the perforations 4 are exposed and the sound readily passes through such perforations 4 and on through the transmitter unit.

When the openings in the screen and shutter are moved out of registry with each other into the sound excluding position, the effectiveness in excluding the sound waves from reaching the perforations 4 is greatly enhanced by maintaining a tight seal around the circumference 22 of the screen where the periphery of such screen engages the upper surface of the cap 3 and by maintaining a tight seal between the under surface of the shutter and the upper surface of the screen, both at the circumference or periphery of the shutter as well as along the perimeters of the openings 10, 11, 12 and 13. In other words, it is desirable that the under surface of the screen hug the outer surface of the cap 3 throughout the entire surface area of cap and screen and likewise it is desirable that the entire under surface area of the shutter hug the entire upper surface area of the screen so as to effectively exclude the sound waves from reaching the perforations 4 whenever the shutter and screen openings are out of registry.

Figure 3:
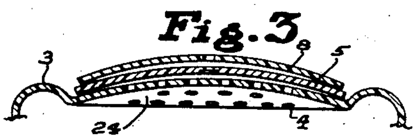
Fig. 3 is a fragmentary sectional detail view of the parts prior to assembly to the mouthpiece cap and taken on the line 3—3 of Fig. 1.
Figure 4:
Fig. 4 is a fragmentary sectional detail view which would be taken on the line 4—4 of Fig. 1 and showing the screen prior to attachment to the mouthpiece cap.

Thus referring to Fig. 3 it will be noted that the curvature radius of the perforated portion 24 of the cap 3 is slightly greater than the curvature radius of the screen 5 and the curvature radius of the screen 5 is slightly greater than the curvature radius of the shutter 8 (the differentiation in the curvature radii of the cap, screen and shutter as viewed in Fig. 3 is exaggerated for illustration purposes). When the shutter is riveted to the screen, the curvature radius of the shutter will be increased slightly so to conform to that of the screen, the shutter being sufficiently resilient as to spring outwardly enough to meet the curvature of the upper surface of the screen and the tension which is being exerted at the circumference of the shutter against the upper surface of the screen is continuous and is sufficient to cause the under surface of the shutter to hug the upper surface of the screen throughout the entire surface area thereof, thereby effectively sealing the under surface of the shutter against the upper surface of the screen. Likewise, the tension which is being exerted between the screen and shutter, primarily at the circumference of the shutter, establishes a pre-determined amount of frictional drag between screen and shutter so that when the shutter is rotated from notch 18 to notch 19, the frictional drag between the screen and shutter will be sufficient to hold the shutter in closed position relative to the screen or in fully open position as shown in Fig. 1. The screen and the shutter may be made of sheet metal, or plastic, or some such suitable material. A pair of rivets 26 and 27 may have their heads embedded within the wall of the screen and said rivets may be spaced apart from each other a distance which is slightly less than the span between a predetermined pair of perforations 4 in the transmitter cap so that when pressure is applied downwardly against the shutter at the rivet 16, the shutter and screen will spring outwardly sufficiently to permit the rivets 26 and 27 to drop into the pair of openings 28 and 29 in the transmitter cap thereby causing the under surface of the screen to hug the entire upper surface area of the transmitter cap and at the same time to cause the rivets 26 and 27 to be anchored within the perforations 28 and 29 under a continuous tension wherein the rivets are tending to spring back toward each other to their normal position of spacing as indicated in solid lines in Fig. 4. Thus by means of the spacing of the rivets 25 and 27 I have made it possible to provide suitable means for anchoring the screen relative to the transmitter cap and at the same time increase the curvature radius of the screen to conform to the curvature radius of the transmitter cap thereby providing an effective sealing between these two members.

Figure 6:
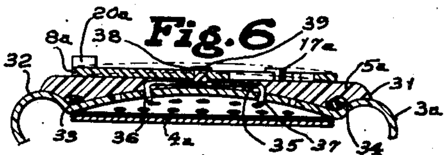
Fig. 6 is a fragmentary sectional detail view taken on the line 6—6 of Fig. 5.
Figure 2:
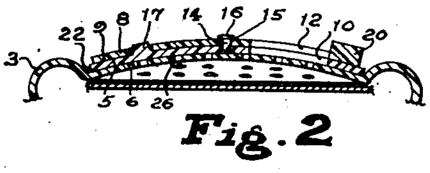
Fig. 2 is a fragmentary sectional detail view taken on the line 2—2 of Fig. 1.
Figures 5, 8:
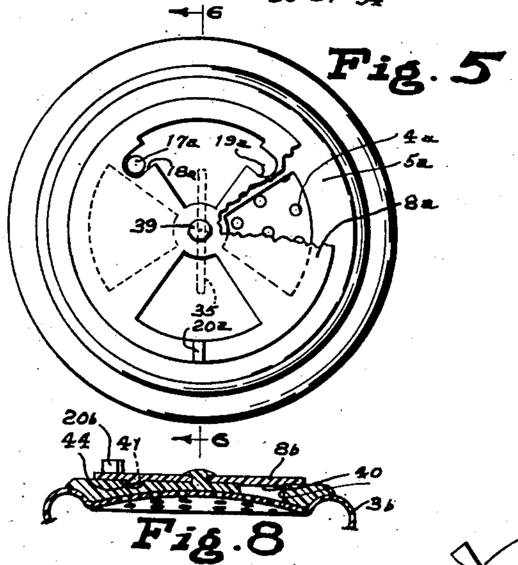
Fig. 5 is a plan view of a modified form of the invention.
Fig. 8 is a fragmentary sectional detail view taken on the line 8—8 of Fig. 7.

In the form of the invention as shown in Figs. 5 and 6 the screen 5*a* may have its under surface shaped to conform to the configuration of the upper surface of the transmitter cap 3*a*, the periphery of the screen 31 overhanging a substantial portion of the annular bead 32 formed on the transmitter cap. An annular gasket 33 which may be of rubber or some other suitable compressible material may be received within an annular groove 34 in the under surface of the screen and adhered thereto as by means of a suitable adhesive. The gasket functions to seal the circumferential margin of the screen relative to the transmitter cap. The screen may have a wire 35 permanently embedded therein, the outer ends of which are turned downwardly to form the gripping legs 36 and 37 which are received within a pair of the perforations 4*a* in the transmitter cap. The legs 36 and 37 may be bent inwardly slightly toward each other requiring that the legs be spread outwardly slightly when inserted into the perforations in the cap, thereby establishing a permanent tension condition for anchoring the screen relative to the cap. A rivet portion 38 may be formed integrally with the screen if desired and the shutter 8*a* may be initially of concave-convex section as indicated in dotted lines in Fig. 6 and sprung inwardly when positioned onto the shank of the rivet portion 38 and held under tension against the upper surface of the screen until a head portion 39 can be formed on the rivet to anchor the shutter relative to the screen, however, permitting rotation of the shutter relative to the screen. The openings 12 and 13 in the shutter are brought into registry with the openings 10 and 11 in the screen by grasping tab 20*a* and rotating the shutter relative to the screen as has been fully explained above with reference to the form of the invention of Figs. 1 through 4. Frictional drag between the shutter and screen is accomplished as the result of the tension exerted at the circumference of the shutter as previously explained with reference to the form of the invention as shown in Fig. 1, so that when the shutter is rotated to either the closed position as shown in solid lines in Fig. 5 with the boss 17*a* received within notch 18*a* or to the open position in which the notch 19*a* would be swung over against the boss 17*a*, when the shutter will remain in such rotated position due to the frictional drag between the shutter and the screen.

Figures 7, 10:
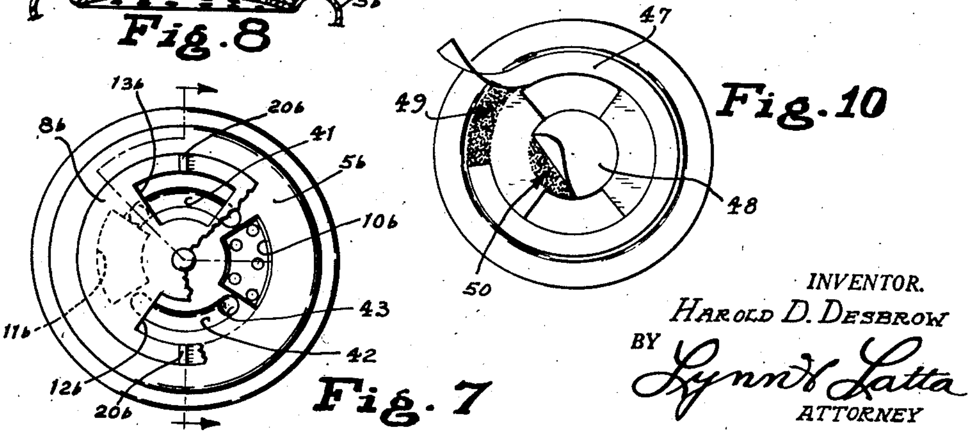
Fig. 7 is a plan view of another form of the invention.
Fig. 10 is an underneath view of the screen alone of Figs. 7 and 8 prior to its assembly to the mouthpiece cap.

In the form of the invention as shown in Figs. 7 and 8, the shutter 8*b* may have the diametrically opposed openings 12*b* and 13*b* which are of substantially the same size and configuration as the openings 10*b* and 11*b* in the screen 5*b* except that the openings 10*b* and 11*b* preferably have tapered side walls and tapered end walls, the angles of inclination of which correspond to the tapered side and end walls of diametrically opposed lugs 40 (only one of which is shown in Fig. 8) so that when the shutter is rotated by grasping tabs 20*b* to closed position (as is shown in Fig. 7) the lugs on the shutter will drop down into the respective openings in the screen, thereby effecting a very satisfactory seal between shutter and screen. The upper surface of the screen is provided with arcuate recesses 41 and 42 of comparatively shallow depth (as indicated by the dotted lines in Fig. 8), the outer ends of which recesses communicate with the end indentations 43 which are of greater depth than the central portion of the recesses to accommodate the beads 44 which are formed on the under surface of the shutter at diametrically opposite locations thereon (only one bead being shown in Fig. 8). When the shutter is rotated to closed position the beads 44 will drop into the indentations at the ends of the arcuate recesses so that the under surface of the shutter will rest snugly against the upper surface of the screen and when the shutter is rotated to open position the initial one or two degrees of rotation will cause the beads 44 to immediately ride up the ramp afforded at the juncture of the indentations 43 and the shallow recesses 41, thereby causing the lugs 40 on the opposite sides of the under surface of the shutter to immediately move out of the openings 10*b* and 11*b* while the shutter is being rotated to open position.

Figure 9:
Fig. 9 is a fragmentary sectional detail view of a modified form of the invention of Fig. 8.

The undersurface of the screen is secured to the perforated mouthpiece cap 3*b* by means of an adhesive coating which is formed on the under surface of the screen, the adhesive causing the under surface of the screen to cling in a tight sealing manner to the upper surface of cap 3*b*. The adhesive may be initially applied to the under surface of the screen and then covered with the removable ribbon 47 and disc 48 which form a protective covering for the adhesive until such time as one is prepared to affix the sound excluding accessory to the telephone instrument, then the ribbon and disc may be peeled off as indicated in Fig. 10 exposing the adhesive areas 49 and 50 which are applied directly to the upper surface of cap 3*b* as shown in Fig. 8. In Fig. 9 I have shown a modified form of the invention of Figs. 5 and 6 wherein instead of utilizing the wire 35, a pair of spring clips 51 and 52 may have their heads embedded within the wall of the screen 5*c* and the shanks thereof are split to form separate legs 53 and 54, the outer ends of which are bowed slightly so that when forced through a pair of the perforations 4c in cap 3c, they will spring outwardly to hold the screen onto the cap.

I claim:

1. An appliance for a telephone transmitter having a mouthpiece including an inwardly concave, upwardly convex central body portion provided with perforations therein, said appliance comprising: a resilient, perforated sound screen overlying the mouthpiece, said screen having a plurality of lugs projecting from the concave face thereof in converging relation to one another and positioned to be received in certain perforations of said mouthpiece, said screen having a radius of curvature normally less than that of said mouthpiece, and said lugs being normally spaced from one another a distance of slightly less than the spacing of the mouthpiece perforations in which they are received, whereby said lugs are receivable in said perforations when said screen is flattened into conformity to the curvature of the mouthpiece and will grip a portion of said mouthpiece between said perforations by reason of the resiliency of the screen tending to return to its normal curvature; a shutter overlying the screen and rotatably attached thereto, said shutter and sound screen having respective apertures adapted, by rotation of the shutter, to be brought to an open position, in communication with one another or to a closed position in which said apertures are out of communication whereby to permit sounds to pass through the shutter and screen when the apertures are in communication and to exclude sounds when the shutter is in said closed position, the underface of said shutter exerting continuous tension against the upper face of the screen to develop a frictional drag between the shutter and screen for holding the shutter in any selected position of rotation.

2. An appliance as defined in claim 1, wherein said lugs are adapted to drop into the apertures of the screen when the shutter is rotated to said closed position, and including means for lifting the shutter lugs out of the screen apertures when the shutter is rotated to open position relative to the screen.

3. An appliance for a telephone transmitter having a mouthpiece including an inwardly concave, outwardly convex central body portion provided with a plurality of perforations therein, said mouthpiece being of convex-concave section, said appliance comprising: a resilient perforated sound screen overlying the mouthpiece; means for securing the screen to the mouthpiece, said means including spaced lugs secured to and projecting outwardly from the under surface of the screen, said lugs being received within selected spaced perforations of the mouthpiece; a perforated shutter overlying the screen and being rotatably secured thereto, whereby to bring the perforations of the shutter alternately into or out of registry with the perforations of the screen, whereby to permit sound to pass through the shutter and screen when the perforations of shutter and screen are in registry or to exclude sound from passing through the screen when the perforations of the shutter are closed off from and out of registry with the perforations of the screen; a lug secured to the screen and projecting upwardly through one of the shutter perforations whereby to limit the rotative movement of the shutter relative to the screen within the limits of the shutter perforation through which the screen lug projects, said lug engaging one limit of the shutter perforation when the shutter perforations are in registry with the screen perforations and said lug engaging the opposite limit of the shutter perforation when the shutter perforations are closed off from the screen perforations, said screen being of a normal curvature less than that of said mouthpiece whereby said lugs, as engaged in said apertures, are resiliently urged toward one another to grip between them the section of mouthpiece between the apertures in which said lugs are engaged, whereby to attach the screen to the mouthpiece.

4. An appliance for a telephone transmitter having a mouthpiece with perforations therein, said appliance comprising: a sound screen overlying the mouthpiece and secured in fixed relation thereto; a shutter overlying and rotatably attached to the screen, said screen being interposed between the shutter and the mouthpiece; said shutter and sound screen having respective apertures adapted by rotation of the shutter to be brought to an open position in communication with one another, permitting sound to pass through the shutter and screen, or to a closed position in which said apertures are out of communication, for excluding sound from the mouthpiece; a lug formed on the screen and projecting upwardly through one of the shutter apertures and engageable with the opposite ends of said one aperture for limiting the rotational movement of the shutter relative to the screen in both directions of rotation, said lug engaging one end of said one shutter aperture in said open position and the opposite end of the said one shutter aperture in said closed position; said screen being in the form of a disc of convex-concave section having a radius of curvature normally less than that of said mouthpiece, and having radially projecting lugs spaced to be received in the mouthpiece perforations when the screen is flattened into conformity to the curvature of the mouthpiece and operative to grip a portion of said mouthpiece between said perforations by reason of the resiliency of the screen tending to return to its said normal curvature.

5. An appliance for a telephone transmitter having a mouthpiece with perforations therein, said appliance comprising: a perforated sound screen overlying the mouthpiece and being secured thereto; an annular groove in the under surface of the screen; an annular washer of compressible material secured within the annular groove and engageable with the mouthpiece to encompass the perforations thereof and to establish a seal between the screen and the mouthpiece in the area of the circumference of the screen; spaced lugs secured to the underside of the screen and received within spaced perforations of the mouthpiece, said lugs being normally spaced slightly closer to one another than the perforations in which they are received, and consequently said lugs exerting a lateral tension relative to the mouthpiece perforations; a perforated shutter overlying the sound screen and being secured thereto so as to be rotatable relative thereto, said shutter being selectively rotated relative to the sound screen to alternately bring the perforations of the shutter into or out of registry with the perforations of the screen.

6. An appliance for a telephone transmitter as set forth in claim 3 wherein the spaced lugs are in the form of rivets, the rivets having their shanks split to form opposed legs which are normally bowed slightly relative to each other so as to spring inwardly when inserted within the mouthpiece perforations, whereby to exert tension against the walls of the perforations.

7. An appliance for a telephone transmitter mouthpiece having a toroidal rim portion and an outwardly convex, inwardly concave central body having perforations therein, comprising: a perforated sound screen proportioned and shaped to fit substantially within said rim and to lie close to the plane thereof; said screen having a concave underface adapted to fit snugly against the convex outer face of said central mouthpiece body; a shutter of disc form means pivotally connecting the center of the shutter to the screen for relative rotation; said shutter and screen having respective perforations adapted at one position of rotation of the shutter to register with one another and in another position of such rotation to be out of registry, a lug formed on the screen and projecting upwardly through one of the shutter perforations and engageable with opposite ends thereof for limiting the rotative movement of the shutter in both directions, to determine limits of movement in one of which the screen perforations are in registry with the shutter perforations and in the other of which the screen perforations are closed off by the shutter.

8. Appliance as defined in claim 7, wherein the means for securing the screen to the mouthpiece includes an adhesive secured to the under side of the screen and engageable with the outer surface of the mouthpiece for anchoring the screen relative to the mouthpiece, the path of the adhesive encompassing the perforations of the mouthpiece.

References Cited in the file of this patent

UNITED STATES PATENTS

| | | |
|---|---|---|
| 801,683 | Penfold | Oct. 10, 1905 |
| 933,228 | Burkholder | Sept. 7, 1909 |
| 1,877,372 | Truesbury | Sept. 13, 1932 |
| 2,033,042 | Mazzella | Mar. 3, 1936 |
| 2,425,061 | Hart | Aug. 5, 1947 |